(12) United States Patent
Helinski

(10) Patent No.: US 9,854,739 B2
(45) Date of Patent: Jan. 2, 2018

(54) DE-GRASSER SYSTEM

(71) Applicant: Joseph Alan Helinski, Millen Place, NY (US)

(72) Inventor: Joseph Alan Helinski, Millen Place, NY (US)

( * ) Notice: Subject to any disclaimer, the term of this patent is extended or adjusted under 35 U.S.C. 154(b) by 0 days.

(21) Appl. No.: 14/628,561

(22) Filed: Feb. 23, 2015

(65) Prior Publication Data
US 2016/0242354 A1 Aug. 25, 2016

(51) Int. Cl.
*A01D 34/67* (2006.01)
*B05B 15/00* (2006.01)

(52) U.S. Cl.
CPC ............ *A01D 34/67* (2013.01); *B05B 15/001* (2013.01)

(58) Field of Classification Search
CPC .. A01B 1/18; A01B 1/16; A01B 1/165; A01B 45/04; A01B 45/02; E21B 25/00; E21B 10/02; A47J 25/00; B05B 15/001; A01D 34/67
USPC ......... 294/50.5–50.7; 175/321, 244, 403, 20, 175/58; 172/22, 20; 30/316
See application file for complete search history.

(56) References Cited

U.S. PATENT DOCUMENTS

| | | | | |
|---|---|---|---|---|
| 1,456,153 A | * | 5/1923 | Seeger | E21B 11/005 175/403 |
| 4,884,638 A | * | 12/1989 | Hoffman | A01B 1/165 172/22 |
| 5,461,788 A | * | 10/1995 | Taylor | A01G 3/06 172/25 |
| 5,938,290 A | * | 8/1999 | Mikeska | A01D 34/835 172/25 |
| 6,662,879 B1 | * | 12/2003 | Costa | A01C 5/02 172/22 |
| D541,606 S | * | 5/2007 | Griffin | D8/1 |
| 8,230,950 B2 | * | 7/2012 | Alcov | A01B 1/165 172/22 |

* cited by examiner

*Primary Examiner* — Stephen A Vu
(74) *Attorney, Agent, or Firm* — Lillie Law, LLC; James J. Lillie

(57) ABSTRACT

A de-grassing system having a body, a handle, and a cutter; the body having a longitudinal hollow chamber with an axis extending axially there through, with a top and bottom, the chamber further having a port permitting water to egress; the handle having a longitudinal hollow cylinder having a proximal and distal end, wherein the proximal end has a substantially perpendicular longitudinal hollow cylinder affixed thereto at the midpoint of the substantially perpendicular longitudinal hollow cylinder, wherein the substantially perpendicular longitudinal cylinder has a pair of ends providing means for rotating the system about the axis; the top connecting outwardly from the chamber for receiving the distal end of the handle; and the cutter forming the bottom, having a plurality of teeth extending axially outwardly from the chamber to engulf the sprinkler head.

13 Claims, 2 Drawing Sheets

US 9,854,739 B2

DE-GRASSER SYSTEM

CROSS REFERENCE TO RELATED APPLICATIONS

This utility application claims priority from U.S. Provisional Patent Application having Ser. No. 61/943,459 and having a filing date of 23 Feb. 2014.

BACKGROUND OF THE INVENTION

This invention relates to a system which is used to trim debris from about an in ground sprinkler head, in particular, a system deployed to trim debris from about an in ground sprinkler head while the sprinkler system, and head is in actively in operation discharging water. In ground sprinkler heads are commonly placed in lawns, and fields to keep the vegetation such as grass, irrigated, whether it is on a golf course, or a business' or individual's lawn. A common issue with sprinkler heads over time, is that the vegetation, such as grass or weeds, begins to grow, or grows over the sprinkler head, which ultimately affects the effectiveness of the sprinkler head. If the grass is not trimmed back, the grass may prevent the sprinkler head from popping up to discharge water, either in whole or in part, if a pop up sprinkler head, or functioning as intended with the design of the sprinkler head. Currently, there are no known products on the market nor on file that appear to address the issue of trimming the vegetation, such as grass or weeds, from about the sprinkler head, during operation of the sprinkler head, e.g., when the water is on in the zone of the system and the zone and sprinkler head is discharging water, and hence there is a long felt need for a system that provides such feature.

SUMMARY OF THE INVENTION

The present invention is directed to a de-grasser system for trimming debris from about a sprinkler head. The system is specifically designed to be deployed while a sprinkler head is in operation discharging water.

A first objective of the system is to provide a means for trimming the debris from about a sprinkler head.

A second objective of the system is to provide a means for trimming the debris from about a sprinkler head while the sprinkler head is in operation discharging water.

A third objective of the system is to provide means for the operator to more efficiently trim all the sprinkler heads on a particular job while the water in the heads are on and the heads are deploying water, thereby reducing the time for the job and maintenance thereof.

A fourth objective of the system is to provide means for the operator to be able to identify whether the vegetation about the sprinkler head that was just trimmed, was also out of adjustment, nearly simultaneously.

Other objectives, advantages, and novel features of the present invention will become more apparent from the following detailed description when taken in conjunction with the accompanying drawings.

BRIEF DESCRIPTION OF THE DRAWINGS

The following drawings, in which like reference characters indicate like parts, are provided for illustration of the invention and are not intended to limit the invention in any manner whatsoever.

DETAILED DESCRIPTION OF THE INVENTION

The following descriptions of the preferred embodiments are presented to illustrate the present invention and are not to be construed to limit the claims in any manner whatsoever.

Figure 1:
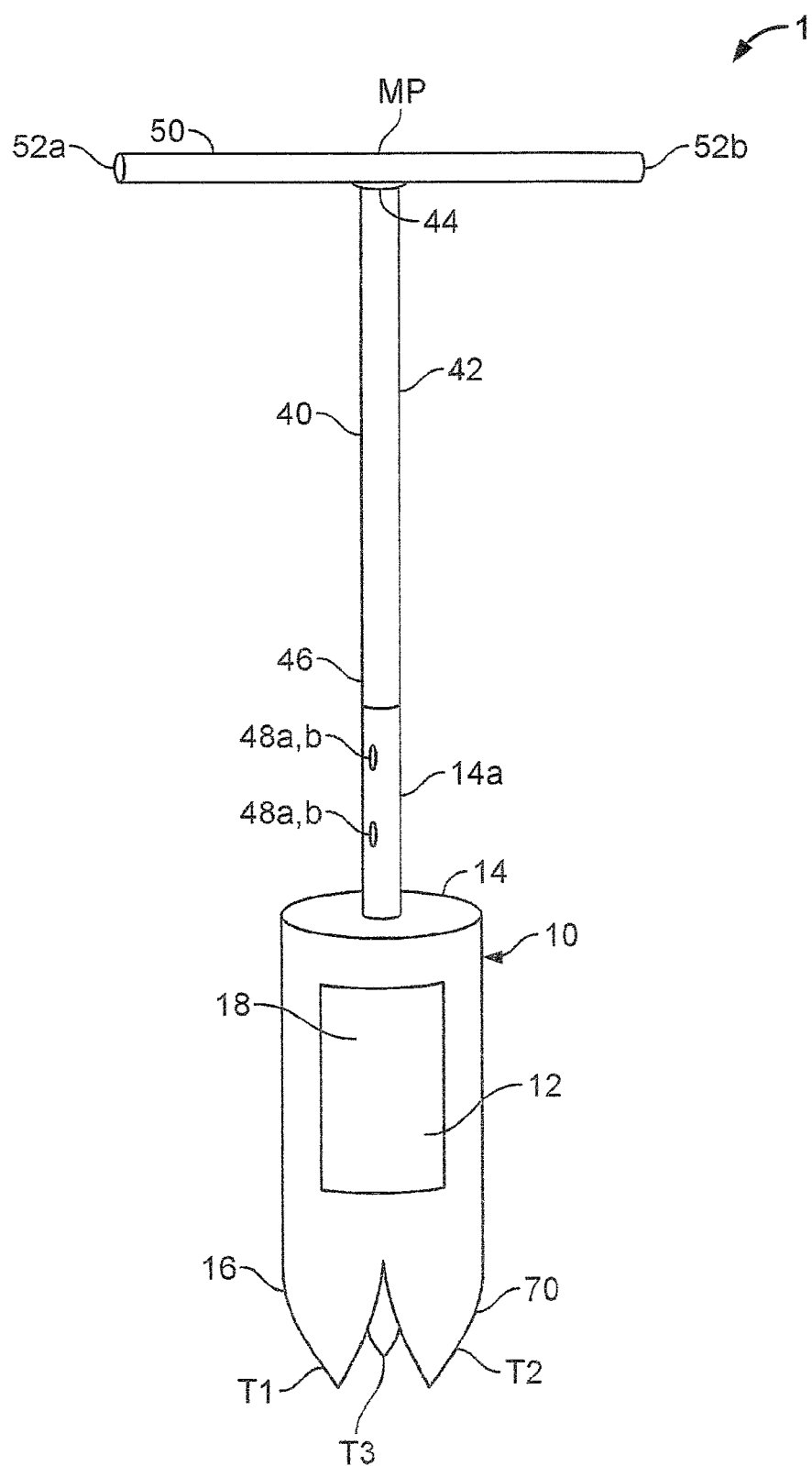
FIG. 1 illustrates a front view of the preferred embodiment.
Figure 2:
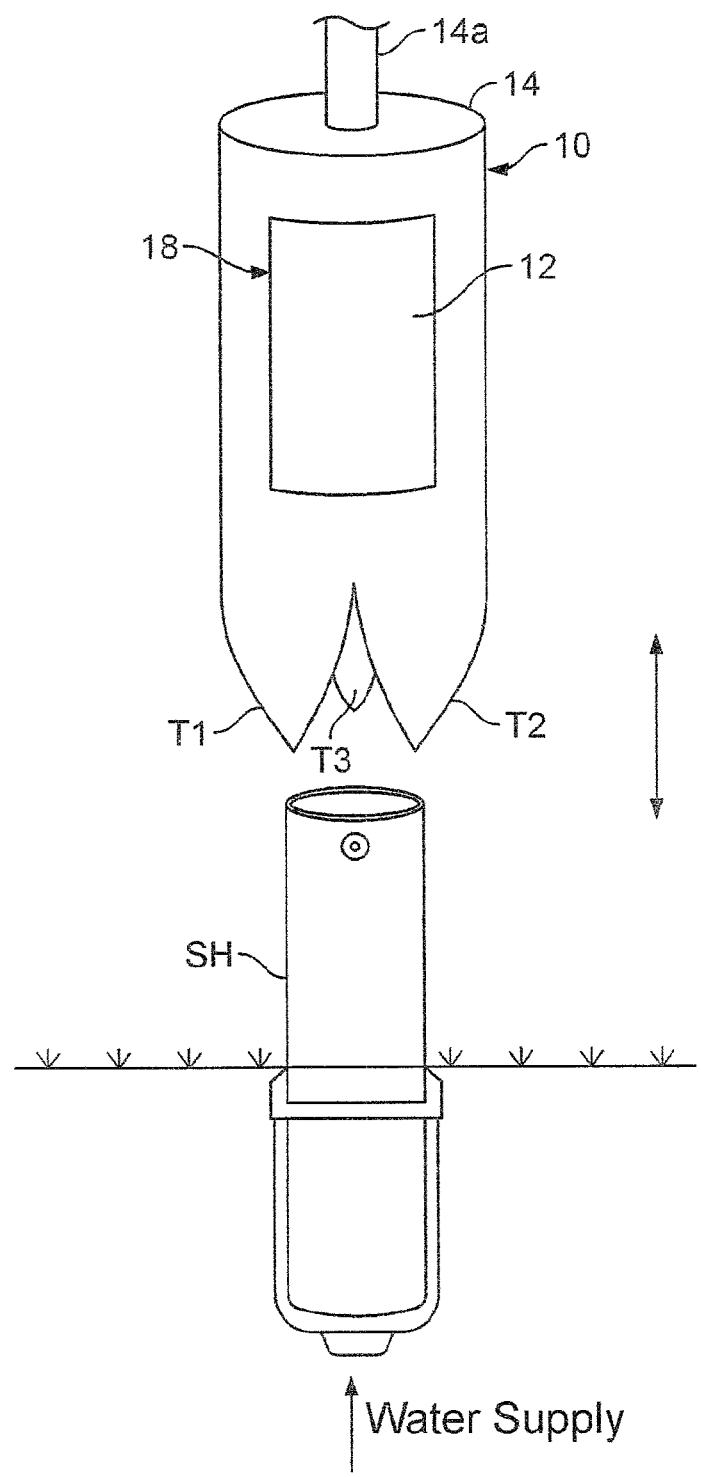
FIG. 2 illustrates a front view of the body the preferred embodiment in use about an in ground sprinkler head.

In reference to FIGS. 1 through 2, the preferred embodiment of the present invention is disclosed, which is directed to a de-grasser system for trimming debris from about a sprinkler head. The system 1 is specifically designed to be deployed while a sprinkler head SH is in operation discharging water. A de-grassing system 1 having a body 10, a handle means 40, and a cutting means 70; said body 10 having a longitudinal hollow chamber 12 with an axis extending axially there through, with a top 14 and bottom 16, said chamber further having a port 18 for permitting egress of water from a sprinkler head SH while the sprinkler head SH is discharging water during use. The size of the port 18 will be determined by the material used for the system, although it is preferred that the port be roughly nor more than half away around the outer wall, e.g., 180 degree relief; although in the figures, it is about one third, or about 120 degree+/− about 60 degrees. There is a balance of providing enough egress for the water to exit without too much pressure building up inside the chamber during use, whilst minimizing the fugitive spray hitting the operator during the same period.

Said handle means 40 comprising a longitudinal hollow cylinder 42 having a proximal 44 and distal end 46, wherein said proximal end 44 has a substantially perpendicular longitudinal hollow cylinder 50 affixed thereto at the midpoint MP of said substantially perpendicular longitudinal hollow cylinder 50, wherein said substantially perpendicular longitudinal cylinder 50 has a pair of ends 52a,b providing means for rotating said system 1 about said axis by the operator. Depending on the strength of the operator, the soil conditions, and the diameter of the sprinkler head SH, will determine the length of the cylinder 50, although it is envisioned that about 18 inches+/−about 10 inches.

Said top 14 having a connecting means 14a extending outwardly from said chamber 12 for receiving said distal end 46 of said handle means 40.

Said cutting means 70 forming said bottom 16, comprising a plurality of teeth T1, T2, T3 extending axially outwardly from said chamber 12 to engulf the sprinkler head SH. The edge of each tooth T1, T2, T3 contacts the ground, first as the system is inserted into the ground in the y-direction, and then second, as the system is rotated about the axis about the sprinkler head SH in a first direction, e.g., clockwise, and third, as the system is rotated about the axis about the sprinkler head SH in the second direction, e.g., counterclockwise. In this fashion, the edge of each tooth T1, T2, T3 cuts the debris in three directions. It should also be noted, that the length of the handle means 40 will also be a function of the height of the operator, soil conditions, temperature, although the embodiment uses about overall height of the system of about 36 inches+/−about 12 inches.

In order to assist one in the understanding of the operation of the present invention 1, it would be advantageous to consider use in practice. In the preferred embodiment, the system 1 is assembled by having the handle means 40 snap in to the body 10 via connecting means 14a. There are two alignment means 48a,b that cooperatively connect the distal end 46 of the handle means 40, similar to a spring like button that when inserted aligns with the two orifices in the connecting means 14a, the buttons snap into place; however, it is envisioned that pins may also be used or other conventional method, or even that the handle means 40 and the body 10 may be fabricated as one piece. Nevertheless, once assembled, the system 1 is ready for use.

In the spring in the northeast, a homeowner's irrigation system is turned on once temperature permits, and each zone has a predetermined run time, wherein each zone has at least one sprinkler head, typically a plurality of heads, Nevertheless, when zone one is turned on, and actively discharging water, the operator would use the system 1 on each head SH, first by aligning the axis directly over the head SH, and then by lowering the system 1 downwardly about the targeted sprinkler head SH. The operator may then press downwardly with their arms and simultaneously turn the handles in either a clockwise or counterclockwise motion so the teeth T1, T2, and T3 cut the grass and clear the debris from about the periphery of the sprinkler head. The operator may also optionally, step on the top 14 for added force to ensure the system 1 is deployed deep enough depending on a plethora of factors, including but not limited to, type of grass, density of grass, dryness of the grass, dirt, rocks, temperature, etc.

While the operator has deployed the system 1, it should be noted that there should be some space between the inner wall of the chamber 12 and the outer wall of the head SH, that includes between the top of the head SH, and the underside of the top 14 inside the chamber 12. In either case, if too tight, or too much debris, there is some risk that the direction/orientation of the head SH might be compromised. Moreover, by the system 1 having port 18, the water discharged from the head SH has a place to egress. Still further, once the head SH is trimmed to the satisfaction of the operator, the operator need only remove the system 1 from the head SH, and then may immediately adjust the head SH without re-walking the property again. More specifically, adjustment meaning how many degrees of operation the head SH can turn, or whether the 180 degree start and finish points now spray on to the street, and on the other side omit part of the grass, or even to adjust the length of the radius of the stream of water. This key feature enables the operator to essentially perform two functions nearly simultaneously and thus saving time, and money, and reducing if not eliminating the need for the customer to call the operator back to adjust the heads, or for the operator to re-walk the property to adjust heads during the same visit.

In practice, the operator may find use for storing the little flags that are typically used in the industry for locating head SH, and hence either a slot maybe incorporated into the cylinder 42 for storage within the cylinder 42 (not shown), and/or a secondary cylinder may be integrated with the cylinder 42 externally to thereto (not shown).

All of the above referenced patents; patent applications and publications are hereby incorporated by reference. Many variations of the present invention will suggest themselves to those of ordinary skill in the art in light of the above detailed description. All such obvious modifications are within the full-intended spirit and scope of the claims of the present application.

What is claimed is:

1. A de-grasser system comprising:
   a body having a longitudinal hollow chamber having an outer wall with an axis extending axially there through, with a top and bottom, wherein said outer wall is solid to block egress of water from spraying the operator during use; said chamber further having a port in the outer wall having a width and height for permitting egress of water from a sprinkler head;
   a handle comprising a longitudinal hollow cylinder having a proximal and distal end, and a midpoint therebetween, wherein said proximal end has a substantially perpendicular longitudinal hollow cylinder affixed thereto at the midpoint of said substantially perpendicular longitudinal hollow cylinder, wherein said substantially perpendicular longitudinal cylinder has a pair of ends for rotating said system about said axis;
   said top having a connector extending outwardly from said chamber for receiving said distal end of said handle; and a
   a cutter forming said bottom, wherein said cutter is positioned below said port, said cutter comprising a plurality of teeth extending axially outwardly from said chamber to engulf the sprinkler head.

2. A de-grasser system as in claim 1, wherein the width of said port comprises a relief not exceeding about one hundred and eighty degrees of relief about the outer wall.

3. A de-grasser system as in claim 1, wherein the height of said port permits egress of water directly from a sprinkler head.

4. A de-grasser system as in claim 1, wherein the substantially perpendicular hollow cylinder has a length of about 18 inches+/−10 inches.

5. A de-grasser system as in claim 1, wherein the system has an overall height of about 36 inches+/−about 12 inches.

6. A de-grasser system comprising:
   a body having a longitudinal hollow chamber having an outer wall with an axis extending axially there through, with a top and bottom, wherein said outer wall is solid to block egress of water from spraying the operator during use; said chamber further having a port in the outer wall comprising a relief with a width and height for permitting egress of water directly from a sprinkler head;
   a handle comprising a longitudinal hollow cylinder having a proximal and distal end, and a midpoint therebetween, wherein said proximal end has a substantially perpendicular longitudinal hollow cylinder affixed thereto at the midpoint of said substantially perpendicular longitudinal hollow cylinder, wherein said substantially perpendicular longitudinal cylinder has a pair of ends for rotating said system about said axis;
   said top having a connector extending outwardly from said chamber for receiving said distal end of said handle; and a
   a cutter forming said bottom, said cutter is positioned below said port, said cutter comprising a plurality of teeth extending axially outwardly from said chamber to engulf the sprinkler head.

7. A de-grasser system as in claim 6, wherein said relief does not exceed about one hundred and twenty degrees of relief about the outer wall.

8. A de-grasser system as in claim 6, wherein said substantially perpendicular hollow cylinder has a length of about 18 inches+/−6 inches.

9. A de-grasser system as in claim 6, wherein said system has an overall height of about 36 inches+/−about 12 inches.

10. A de-grasser system as in claim 6, wherein said handle snaps together with said body via said connector.

11. A de-grasser system as in claim 6, wherein said handle further includes an alignment that snaps into an orifice in said top.

12. A de-grasser system as in claim 6, wherein said plurality of teeth includes three symmetrical teeth.

13. A de-grasser system as in claim 12, wherein said teeth provide cutting in three directions.

\* \* \* \* \*